US009658870B2

United States Patent
Liu et al.

(10) Patent No.: US 9,658,870 B2
(45) Date of Patent: May 23, 2017

(54) IN-PROCESS TRAPPING FOR SERVICE SUBSTITUTION IN HOSTED APPLICATIONS EXECUTING ON MOBILE DEVICES WITH MULTI-OPERATING SYSTEM ENVIRONMENT (71) Applicant: OpenMobile World Wide, Inc., Framingham, MA (US)

(72) Inventors: Xianghai Liu, Framingham, MA (US); Chandra Bajpai, Natick, MA (US); Kevin Menice, Stoughton, MA (US); Jarrett Goetz, Boston, MA (US)

(73) Assignee: OpenMobile World Wide, Inc., Framingham, MA (US)

( * ) Notice: Subject to any disclaimer, the term of this patent is extended or adjusted under 35 U.S.C. 154(b) by 0 days.

(21) Appl. No.: 14/516,899

(22) Filed: Oct. 17, 2014

(65) Prior Publication Data

US 2015/0242223 A1    Aug. 27, 2015

Related U.S. Application Data (60) Provisional application No. 61/945,534, filed on Feb. 27, 2014.

(51) Int. Cl.
*G06F 9/455*  (2006.01)
*G06F 12/00*  (2006.01)

(52) U.S. Cl.
CPC .................. *G06F 9/45533* (2013.01)

(58) Field of Classification Search
CPC .............. G06F 9/45558; G06F 21/566; G06F 11/1451; G06F 11/1461; G06F 11/1464;

(Continued)

(56) References Cited

U.S. PATENT DOCUMENTS 5,673,403 A    9/1997   Brown et al.
6,063,128 A    5/2000   Bentley et al.
(Continued)

OTHER PUBLICATIONS

Song et al., A case for scaling applications to many-core with OS clustering, Apr. 2011, 15 pages.*

(Continued)

*Primary Examiner* — Thuy Dao
(74) *Attorney, Agent, or Firm* — Nutter McClennen & Fish LLP; David J. Powsner; Lewis J. Lee (57) ABSTRACT

The invention provides in some aspects a computing device that includes a central processing unit that executes a native operating system including one or more native runtime environments within which native software applications are executing, where each such native software application has instructions for execution under the native operating system. One or more hosted runtime environments execute within the one or more native runtime environments, each of which hosted runtime environments executes hosted software applications that have instructions for execution under a hosted operating system that differs from the native operating system. A first hosted software application executing as a first process of the hosted runtime environments includes an instruction that references a member (hereinafter, "referenced member") of an object defined by an object-oriented programming (OOP) class ("referenced class"). The process executes that instruction utilizing data and/or code (hereinafter, "substitute member") other than that specified by the referenced class as the referenced member. As used here, a "member" of an object is any of a method member and a data member.

10 Claims, 5 Drawing Sheets (58) Field of Classification Search
CPC .... G06F 9/466; G06F 9/4443; G06F 9/45533; G06F 9/45545; G06F 9/45554
See application file for complete search history.

(56) References Cited

U.S. PATENT DOCUMENTS

| | | | |
|---|---|---|---|
| 7,170,526 | B1 | 1/2007 | Johnson |
| 7,266,817 | B1 | 9/2007 | Barrett |
| 7,424,710 | B1 | 9/2008 | Nelson et al. |
| 7,735,018 | B2 | 6/2010 | Bakhash |
| 7,912,863 | B1 | 3/2011 | Meijer et al. |
| 7,996,785 | B2 | 8/2011 | Neil |
| 8,387,048 | B1 | 2/2013 | Grechishkin et al. |
| 8,484,317 | B2 | 7/2013 | Hickman et al. |
| 8,539,515 | B1 | 9/2013 | Protassov et al. |
| 8,819,648 | B2* | 8/2014 | Brown ............... G06F 9/30174 717/136 |
| 8,875,159 | B1 | 10/2014 | Nieuwejaar et al. |
| 8,949,295 | B2* | 2/2015 | McDougall .......... G06F 12/023 707/813 |
| 9,183,026 | B2* | 11/2015 | Wang .................. G06F 9/5077 |
| 9,384,024 | B2* | 7/2016 | Ramakrishnan Nair ........................ G06F 9/461 |
| 9,495,183 | B2* | 11/2016 | Bond ................... G06F 9/4552 |
| 2004/0098731 | A1 | 5/2004 | Demsey et al. |
| 2006/0010433 | A1 | 1/2006 | Neil |
| 2006/0146057 | A1 | 7/2006 | Blythe |
| 2006/0253548 | A1 | 11/2006 | Vitanov et al. |
| 2006/0294515 | A1 | 12/2006 | Gimpl et al. |
| 2007/0094413 | A1 | 4/2007 | Salazar et al. |
| 2007/0192329 | A1 | 8/2007 | Croft et al. |
| 2008/0042923 | A1 | 2/2008 | De Laet |
| 2008/0082811 | A1 | 4/2008 | Davis et al. |
| 2008/0127088 | A1 | 5/2008 | Harmsen et al. |
| 2008/0168479 | A1 | 7/2008 | Purtell et al. |
| 2008/0256564 | A1 | 10/2008 | Fathalla |
| 2009/0063687 | A1 | 3/2009 | Turk |
| 2009/0125902 | A1 | 5/2009 | Ghosh et al. |
| 2009/0228882 | A1* | 9/2009 | Wang .................. G06F 9/5077 718/1 |
| 2010/0107154 | A1 | 4/2010 | Brahmavar et al. |
| 2010/0274551 | A1 | 10/2010 | Das et al. |
| 2010/0274869 | A1 | 10/2010 | Warila et al. |
| 2011/0072426 | A1 | 3/2011 | Huang et al. |
| 2011/0209142 | A1 | 8/2011 | Wookey |
| 2011/0260948 | A1 | 10/2011 | Teng et al. |
| 2011/0270922 | A1 | 11/2011 | Jones et al. |
| 2011/0276621 | A1 | 11/2011 | Edery et al. |
| 2011/0276661 | A1 | 11/2011 | Gujarathi et al. |
| 2011/0314399 | A1 | 12/2011 | Sangster et al. |
| 2012/0011354 | A1 | 1/2012 | Owen |
| 2012/0081353 | A1 | 4/2012 | Yusupov et al. |
| 2012/0089906 | A1 | 4/2012 | Reeves et al. |
| 2012/0092277 | A1 | 4/2012 | Momchilov |
| 2012/0174115 | A1 | 7/2012 | Abbas et al. |
| 2012/0220263 | A1 | 8/2012 | Smith et al. |
| 2012/0236012 | A1 | 9/2012 | Wang |
| 2012/0324338 | A1 | 12/2012 | Meredith et al. |
| 2013/0007698 | A1 | 1/2013 | Warila et al. |
| 2013/0100242 | A1 | 4/2013 | Canitz |
| 2013/0159639 | A1* | 6/2013 | Corrie ..................... G06F 12/00 711/154 |
| 2013/0162680 | A1 | 6/2013 | Perry et al. |
| 2013/0185480 | A1 | 7/2013 | Newell et al. |
| 2014/0115606 | A1 | 4/2014 | Hamzata et al. |
| 2014/0282522 | A1 | 9/2014 | Daly et al. |
| 2015/0193241 | A1 | 7/2015 | Hamzata |
| 2015/0193284 | A1 | 7/2015 | Hamzata et al. |
| 2015/0193285 | A1 | 7/2015 | Hamzata et al. |
| 2015/0193904 | A1 | 7/2015 | Vermeulen |
| 2016/0239321 | A1* | 8/2016 | Dong ..................... G06F 17/30 |

OTHER PUBLICATIONS

Kocoloski et al., Better than native: using virtualization to improve compute node performance, Jun. 2012, 8 pages.*
Tu et al., Secure I/O device sharing among virtual machines on multiple hosts, Jun. 2013, 12 pages.*
International Search Report and Written Opinion for Application No. PCT/US2014/061172, mailed Sep. 1, 2015 (12 pages).
International Search Report and Written Opinion for Application No. PCT/US13/66599 mailed May 12, 2014 (31 pages).
International Search Report and Written Opinion for Application No. PCT/US2014/061164, mailed Feb. 23, 2015 (17 pages).
International Search Report and Written Opinion for Application No. PCT/US2014/061166, mailed Mar. 10, 2015 (14 pages).
International Search Report and Written Opinion for Application No. PCT/US2014/061168, mailed Mar. 11, 2015 (18 pages).
International Search Report and Written Opinion for Application No. PCT/US2014/061171, mailed Mar. 25, 2015 (18 pages).
Johnson, Tim, LinkedIn Profile. 2014, 4 pages. Retrieved Mar. 12, 2014.
U.S. Appl. No. 14/061,288, filed Oct. 23, 2013, Multi-Platform Mobile and Other Computing Devices and Methods.
U.S. Appl. No. 14/516,913, filed Oct. 17, 2014, Host/Hosted Hybrid Apps in Multi-Operating System Mobile and Other Computing Devices.
U.S. Appl. No. 14/517,000, filed Oct. 17, 2014, Graphics Acceleration for Applications Executing on Mobile Devices With Multi-Operating System Environment.
U.S. Appl. No. 14/517,004, filed Oct. 17, 2014, Hosted App Integration Services in Multi-Operating System Mobie and Other Computing Devices.
U.S. Appl. No. 14/517,079, filed Oct. 17, 2014, Multi-Operating System Mobile and Other Computing Devices With Proxy Applications Running Under a Browser.
U.S. Appl. No. 14/517,088, filed Oct. 17, 2014, Hybrid Installation Application Package Files for Multi-Operating System Environment.
International Search Report and Written Opinion for Application No. PCT/US14/61165, mailed May 14, 2015 (14 pages).
Extended European Search Report for Application No. EP 13849062.8, issued Sep. 13, 2016 (13 pages).

* cited by examiner

IN-PROCESS TRAPPING FOR SERVICE SUBSTITUTION IN HOSTED APPLICATIONS EXECUTING ON MOBILE DEVICES WITH MULTI-OPERATING SYSTEM ENVIRONMENT

This applications claim the benefit of priority of U.S. patent application Ser. No. 61/945,534, filed Feb. 27, 2014, entitled IN-PROCESS TRAPPING FOR SERVICE SUBSTITUTION IN HOSTED APPLICATIONS EXECUTING ON MOBILE DEVICES WITH MULTI-OPERATING SYSTEM ENVIRONMENT, the teachings of which are incorporated herein by reference.

BACKGROUND OF THE INVENTION

The invention pertains to digital data processing and, more particularly, to methods and apparatus for executing on a single hardware/software platform applications ("apps") made for execution on multiple different such platforms. The invention has application in supporting cross-platform compatibility among apps for smart mobile devices, e.g., smart phones, tablet computers, set-top boxes, connected televisions, in-vehicle infotainment systems, or in-flight entertainment systems, and the like, all by way of non-limiting example.

The smart mobile device market has grown nearly 40% in the past year, according to analysts. This has been fueled, to a large degree, by the sale of devices running variants of the open-source Linux and Android operating systems. While a boon to the marketplace, those devices suffer as a result of the lack of cross-compatibility of the apps developed for them. Thus, for example, apps developed for mobile devices running the Meego operating system do not run on those executing the Tizen or Android operating systems. That problem is compounded, of course, when one turns to operating systems of entirely different lineages. For example, apps developed for Tizen do not run on those running WebOS or Windows OS, and so forth.

This is not just a problem for consumers who have purchase new mobile devices that lack compatibility with old apps. It is also a problem for manufacturers, carriers and others in the supply chain whose efforts to deliver new hardware/software platforms are stymied by the lack of a large ecosystem of available apps. App developers, too, suffer from fragmentation in the marketplace, since they may be forced to port apps to a variety of platforms in order to establish or maintain product viability.

A few prior art efforts to resolve cross-compatibility issues have met with limited success. For example, Acer's Aspire One supported dual boot modes: one for Windows OS and one for Android. However, the device could not run apps for both operating systems in a single mode.

In view of the foregoing, an object of the invention is to provide improved systems and methods for digital data processing.

Another, more particular, object is to provide such systems and methods as support executing on a single hardware/software platform applications ("apps") made for execution on multiple different hardware/software platforms.

Still another object is to provide such systems and methods as support cross-platform compatibility among apps for smart mobile devices, e.g., smart phones, tablet computers, set-top boxes, connected televisions, in-vehicle infotainment systems, or in-flight entertainment systems and the like, all by way of non-limiting example.

These and other objects are evident in the text that follows and in the drawings.

SUMMARY OF THE INVENTION

The foregoing are among the objects attained by the invention, which provides in some aspects a computing device that includes a central processing unit that executes a native operating system including one or more native runtime environments within which native software applications are executing, where each such native software application has instructions for execution under the native operating system. One or more hosted runtime environments execute within the one or more native runtime environments, each of which hosted runtime environments executes hosted software applications that have instructions for execution under a hosted operating system that differs from the native operating system.

A first hosted software application executing within a first process of the hosted runtime environments includes an instruction that references a member (hereinafter, "referenced member") of an object defined by an object-oriented programming (OOP) class ("referenced class"). The process executes that instruction utilizing data and/or code (hereinafter, "substitute member") other than that specified by the referenced class as the referenced member. As used herein, a "member" of an object is any of a method member and a data member.

Related aspects of the invention provide a computing device, e.g., as described above, in which the referenced member and the substitute member provide like functionality from the perspective of the first software application, yet, that utilize different mechanisms therefor.

Those different mechanisms can be, according to some aspects of the invention, different web (or other external) services. Thus, for example, the referenced member can be a method member of an object defined by the first class, which method member utilizes a first external web service to support mapping, navigation, advertisement, digital wallet, account authorization and/or other services required by the first hosted software application, and whereas the substitute member comprises code that utilizes a second, different web service to support the aforesaid service(s).

Those different mechanisms can be different native functions or services, as well. Thus, for example, in instances where the referenced member would otherwise utilize a telephony, camera, address/contacts, document preview, music/multimedia playback or other function/service native to the hosted runtime environments, the substitute member can utilize, instead, a like function/service of the native operating system.

Still other related aspects of the invention provide a computing device, e.g., as described above, in which the references in the first software application to the referenced member and/or the referenced class are resolved to the substitute member during loading of that software application on the device.

Further aspects of the invention provide methods paralleling the operations for execution of the first software application on a computing device as described above.

The foregoing and other aspects of the invention are evident in the drawings and in the description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Architecture

Figure 1A:
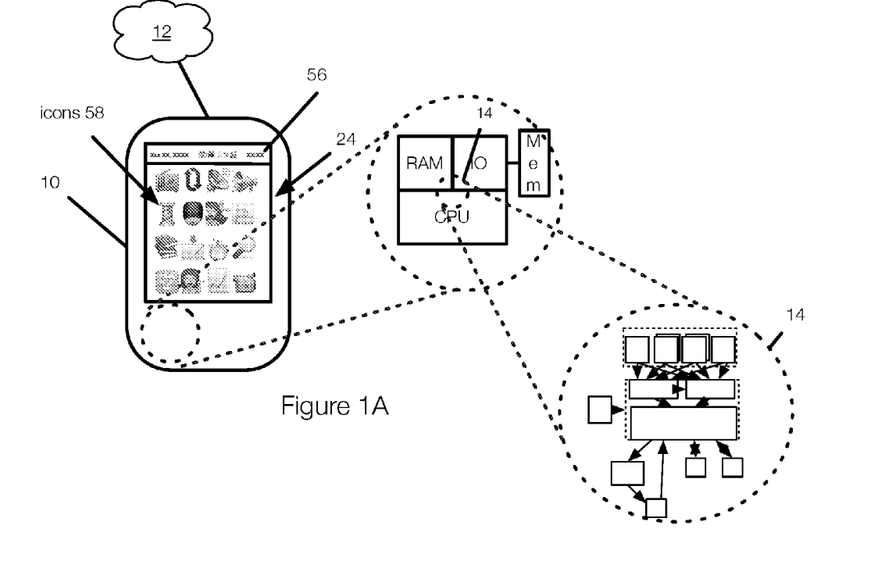
FIGS. 1A-1C depict a computing device of the type embodying the invention.

FIG. 1A depicts a computing device 10 of the type embodying the invention. The illustrated device 10 includes a central processing unit (CPU), input/output (I/O), memory (RAM) and nonvolatile storage (MEM) subsections of the type commonly provided computing devices of the type commercially available in the marketplace, all as adapted in accord with the teachings hereof. In the illustrated embodiment, the device 10 comprises a mobile computing device, such as a smart phone or tablet computer, though, in other embodiments it may comprise other computing devices, mobile or otherwise, e.g., a set-top box, connected television, in-vehicle infotainment system, or in-flight entertainment system, just to name a few.

The device 10 may be connected permanently, intermittently or otherwise to one or more other computing devices, servers, or other apparatus capable of digital communications (not shown) by a network, here, depicted by "cloud" 12, which may comprise an Internet, metropolitan area network, wide area network, local area network, satellite network, cellular network, point-to-point network and/or a combination of one or more of the foregoing, in the conventional manner known in the art, as adapted in accord with the teachings hereof.

The CPU of device 10 (e.g., in conjunction with the I/O, RAM and/or MEM subsections) executes a native operating system 14 of the type commercially available in the marketplace, as adapted in accord with the teachings hereof. Examples of such operating systems include the Meego, Tizen, Android, WebOS, and Linux operating systems, to name just a few. More generally and/or in addition, the native operating system 14 can be a Linux-based operating system, such as, by way of nonlimiting example, an Android-based operating system.

Native Runtime Environment(s)

Figure 2:
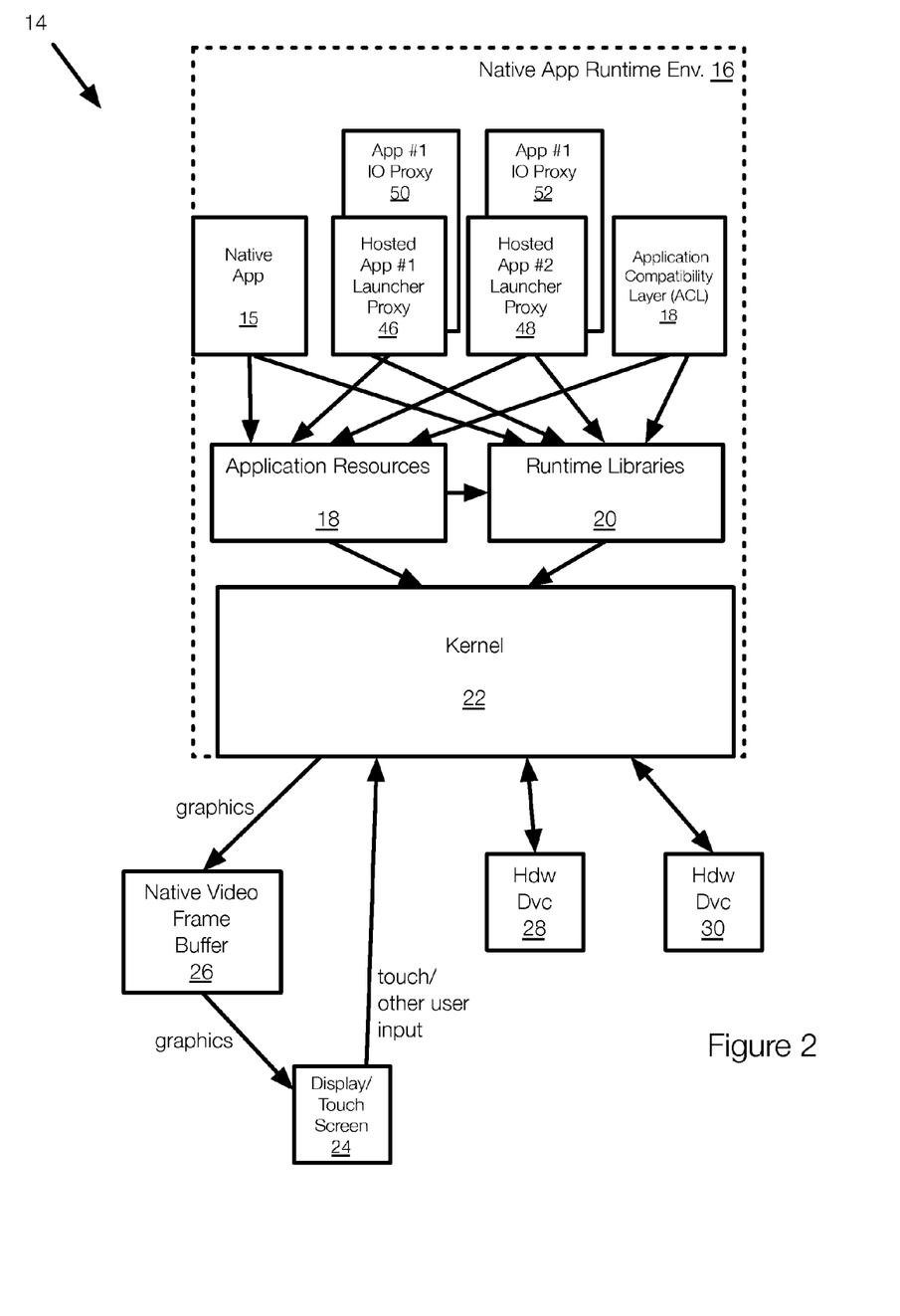
FIG. 2 depicts a native operating system of the type executing in the device of FIG. 1.

FIG. 2 depicts a native operating system 14 of the type executing on illustrated device 10 of FIG. 1.

Referring to that drawing, the native operating system 14 defines one or more native runtime environments 16 of the type known in the art (as adapted in accord with the teachings hereof) within which native software applications of the type known in the art (as adapted in accord with the teachings hereof)—i.e., applications having instructions for execution under the native operating system—are executing. Such applications are labeled 15, 18 and 46-52 in the drawing. As used here and elsewhere herein, the terms "application" and "app" are used interchangeably.

The native runtime environment(s) 16 may comprise one or more virtual machines or otherwise, as is conventional in the art (as adapted in accord with the teachings hereof), depending on the native operating system 14 and the specifics of its implementation on device 10. Illustrated native runtime environment 16 includes, by way of nonlimiting example, application resources 19 and runtime libraries 20, all of the type known in the art, as adapted in accord with the teachings hereof. That runtime environment 16 also includes a kernel 24 of the type known in the art, as adapted in accord with the teachings hereof.

Kernel 24 (or alternate functionality provided in the runtime environment(s) of alternate embodiments) serves inter alia as an interface, in the conventional manner known in the art has adapted in accord with the teachings hereof, between CPU 12 (and, more typically, the native applications executing within the native runtime environment 16 executing thereon) and hardware devices 24-30 integral or attached to device 10. This includes display/touch screen 24 and the frame buffer 26 that drive displays thereon in the conventional manner known in the art, as adapted in accord with the teachings hereof. This can also include, by way of non-limiting example, a keyboard, trackball, touch stick, other user input devices, and/or other integral or peripheral devices of the type known in the art. In the discussion that follows, the display/touch screen 24, the frame buffer 26, and other integral/peripheral devices supporting interactions between the device 10 and its user are referred to as a "hardware interface," regardless of whether they comprise hardware, software or (as is more typically the case) a combination thereof.

A native software application 18, referred to, here, without limitation, as the "Applications Compatibility Layer" or "ACL", executing within the one or more native runtime environments 16 defines one or more hosted runtime environments within which hosted software applications are executing. Each such hosted software application has instructions for execution under a hosted operating system that differs from the native operating system.

Native software applications 46-52 are proxies of hosted software applications 34, 36. Particularly, in some embodiments, hosted software applications executing in hosted runtime environment 32 may have multiple corresponding proxies executing in the native runtime environment 16: a launch proxy and an IO proxy. Here, for illustrative purposes, hosted software application 34 is shown as having a launch proxy 46 and an IO proxy 50. Hosted software application 36 is likewise shown as having a launch proxy 48 and an IO proxy 52. Although, both launch and IO proxies are used in the illustrated embodiment, in other embodiments hosted software applications may have corresponding proxies of only one type (e.g., IO or launch) or otherwise; and, in other embodiments, one or more of the hosted software applications may have no such proxies.

Hosted Runtime Environment(s)

The hosted operating system can be, for example, a Linux-based operating system, such as, by way of nonlimiting example, an Android-based operating system. The native operating system 14 can likewise be, for example, a Linux-based and/or Android-based operating system, albeit, of a different "flavor" than that of the hosted operating system. By way of more particular example, where the native operating system 14 comprises one of the aforementioned Tizen, WebOS, Linux operating systems (as adapted in accord with the teachings hereof), by way of nonlimiting example, the hosted operating system can comprise a "flavor" of the commercially available Android operating system (as adapted in accord with the teachings hereof), again, by way of nonlimiting example.

Figure 3:
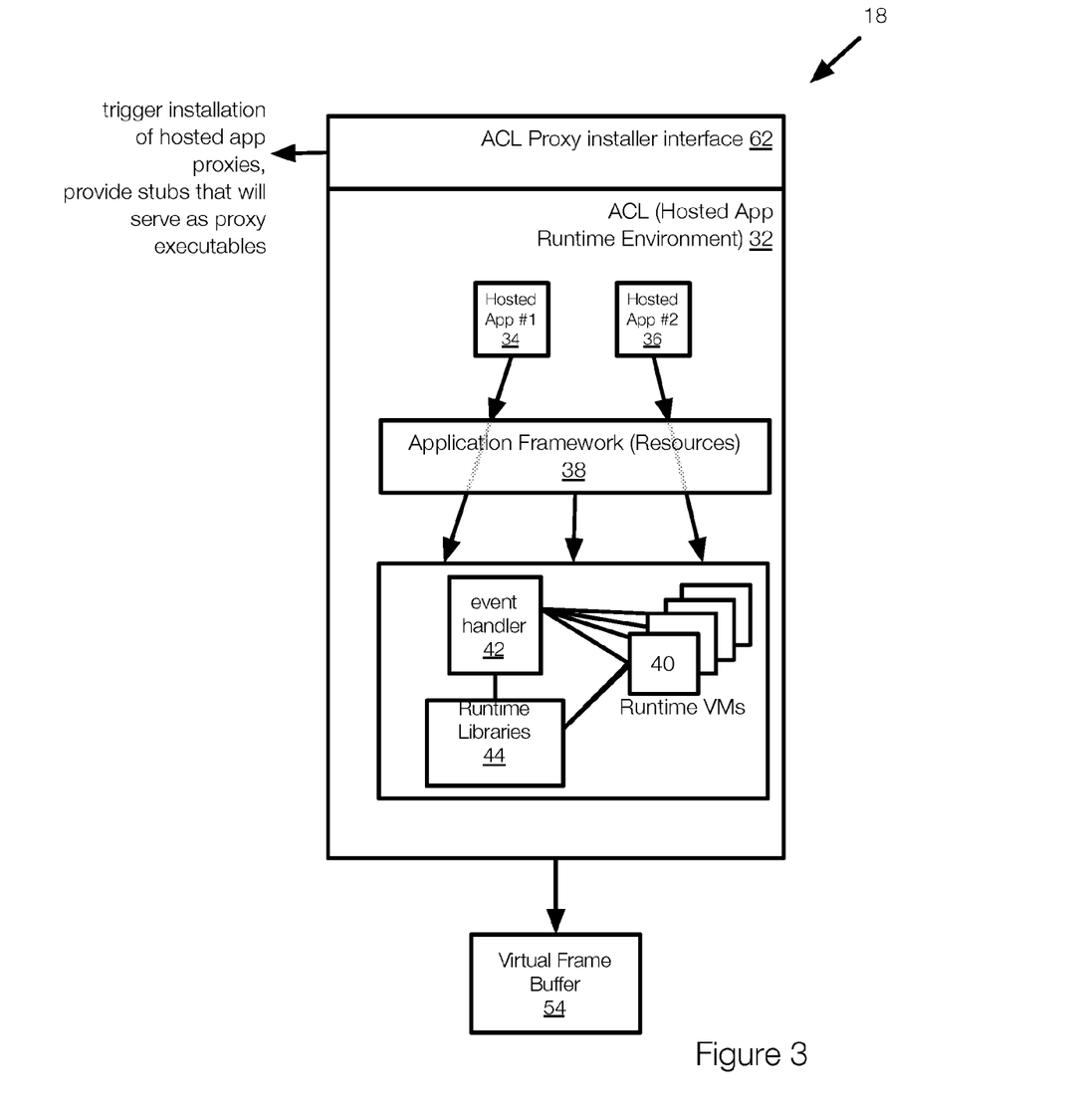
FIG. 3 depicts one or more hosted runtime environments defined by a native software application for execution of hosted software applications in the device of FIG. 1.

FIG. 3 depicts one or more hosted runtime environments 32 defined by the native software application 18 (or ACL) for execution of hosted software applications 34, 36 in the device 10 according to the invention. The illustrated hosted runtime environment 32 is of the type known in the art (as adapted in accord with the teachings hereof) within which software applications having instructions for execution under the hosted operating system (i.e., hosted software applications) are built and intended to be executed.

The hosted runtime environment(s) 32 may comprise one or more virtual machines or otherwise, as is conventional in the art (as adapted in accord with the teachings hereof), depending on the type of the hosted operating system and the specifics of its implementation within the runtime environments 32. Illustrated hosted runtime environment 32 is intended for executing Android-based software applications 34, 36 (though, other embodiments may be intended for executing applications designed and built for other operating systems) and includes, by way of non-limiting example, a resource framework 38, virtual machines (VMs) 40, event handler 42 and run-time libraries 44, all by way of non-limiting example and all of the type known in the art, as adapted in accord with the teachings hereof.

The illustrated runtime environment 32 does not include a kernel per se (as might normally be included, for example, in the runtime environment of a Linux-/Android-based operating system) in the sense of running operations in a protected, kernel space of the type known in the art. Instead, some such operations (e.g., operations that might normally be included, for example, in the kernel of a Linux-/Android-based operating system) are executed in user space.

By way of example, are those kernel space operations relied upon by the resource framework 34, virtual machines (VMs) 36, event handler 42, run-time libraries 44, and/or other components of the runtime environment 32 to load graphics to a frame buffer for presentation on a display. Rather than executing in a kernel of hosted runtime environment 32, in the illustrated embodiment those operations are elevated to user space and are employed to load such graphics to a "virtual" frame buffer 54, which (as discussed below) is shared with the native runtime environment 16 and the applications executing there—particularly, the I/O proxy applications 50, 52.

The execution of other such kernel-space operations can be avoided by passing-off to native operating system 14 and its runtime environment 16 operations and, more broadly, functions required for execution of hosted software applications 34, 36 that would otherwise be performed within the runtime environment 32 and, specifically, for example by a kernel thereof.

Such passing-off, in the illustrated embodiment, is effected, for example, by the resource framework 34, virtual machines (VMs) 36, event handler 42, run-time libraries 44, and/or other components of the runtime environment 32, which communicate with and/or otherwise rely on the native software application proxies 46-52 (executing in runtime environment 16) of hosted software applications 34, 36 to perform such functions or alternates thereof.

A further appreciation of the foregoing maybe attained through the discussion that follows and elsewhere herein, as well as within the incorporated-by-reference applications identified below.

Native and Hosted Software Application Installation

Native software applications, e.g., 15 and 18, are installed (upon direction of the user or otherwise) on device 10 and, more particularly, for execution within native runtime environments 16, in the conventional manner of the art for installations of apps within operating systems of the type of operating system 14. Such installation typically involves cooperative action of native operating system 14 and the runtime environments 16 executing an "installer" app (not shown) of the type conventional to OS 14 and typically includes unpacking, from an application package file (e.g., downloaded from a developer site or otherwise), the to-be-installed application's executable file, icon file, other support files, etc., and storing those to designated locations in static storage (MEM) on device 10, again, in the conventional manner known in the art, as adapted in accord with the teachings hereof. Such application package files are referred to herein as "native" application package files.

Hosted software applications 34, 36 are installed (upon direction of the user or otherwise) under control of ACL 18 for execution under hosted runtime environments 32. To that end, the ACL 18 can utilize an installer app the type conventional to the hosted operating system, albeit, modified as discussed herein, e.g., to unpack from the application package files, or otherwise, the to-be-installed application's executable file, icon file, other support files, etc., to suitable locations in static storage (MEM) on device 10, e.g., locations dictated by native operating system 14, yet, consistent with the hosted operating system, or otherwise. Such application package files are referred to herein as "hosted" application package files.

Unlike other native software applications, e.g., 15 and 18, the native software applications 46-52, if any, that are proxies of a hosted software application 34, 36 are installed, by request from ACL 18 to native operating system 14, in connection with the installation by ACL 18 of each respective hosted software application. Each such proxy 46-52 is installed by the native operating system 14 in the conventional manner, albeit, from application package files (or otherwise) generated by ACL's 18 proxy installer interface 62.

Those package files can include, in lieu of the respective hosted software application 34, 36 executable, a "stub" executable suitable for
 (ii) execution under native operating system 14 and, particularly, within native runtime environments 16,
 (ii) effecting the functions discussed below (and elsewhere herein) attributable to the launch proxies and the IO proxies, respectively.

Those package files can also include icon files that are identical to or variants of those originally supplied with the application package files (or otherwise) for the respective hosted software applications 34, 36. Although, in the illustrated embodiment, two proxies may be associated with each hosted software application, only a single icon is associated with both proxies as displayed on the graphical desktop, e.g., of FIG. 1A.

Multi-Operating System Mobile and Other Computing Devices

The computing device 10 supports the seamless execution of applications of multiple operating systems—or, put another way, it merges the user experience so that applications executed in the hosted runtime environment appear, to the user, as if they are executing within the native operating system 14.

Thus, for example, application windows representing execution of the hosted software applications are presented to the user without interfering with the status bar that forms part of the "desktop" generated as part of the overall graphical user interface by the native operating system 14 and/or native runtime environment 16, thus, making the hosted software applications appear similar to native software applications. This is shown, by way of example, in FIGS. 1A-1C.

Referring to FIG. 1A, the native operating system 14 drives the computing device to display, on display/touch screen 24, a graphical desktop with icons 58 representing applications that can be selected for launch or other activation by the user of the device 10. In the illustrated embodiment, these can be native software applications, e.g., 15, and hosted software applications, e.g., 34, 36.

That desktop display includes a status bar 56 of the type conventional in the art—and, particularly, conventional to native operating system 14 (although, some embodiments may vary in this regard). Here, that status bar 56 indicates the current date/time, carrier conductivity signal strength (e.g., Wi-Fi, cellular, etc.), active apps, and so forth, though, in other embodiments, it may indicate other things.

Figure 1B:
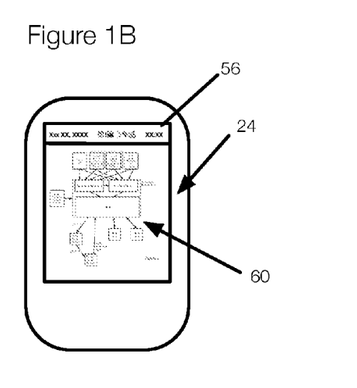

Referring to FIG. 1B, when a native software application, e.g. 15, is activated by the operating system 14 and/or runtime environments 16 in response to user selection, the application window 60 generated for it by the native runtime environment 16 (reflecting execution of the application) for presentation on the screen 24 occupies that screen along with the status bar 56—here, particularly, with the status bar 56 on the top fraction of the screen and the application window 60 on the remainder. Put another way, the operating system 14 and/or runtime environments 16 do not overwrite the status bar 56 with the applications window 60. (Of course, it will be appreciated that this is the default mode of operation of the operating system 14 and/or runtime environments 16, and that in other modes, e.g., so called "full screen" modes, the application window 60 may occupy the entirety of the screen).

Figure 1C:
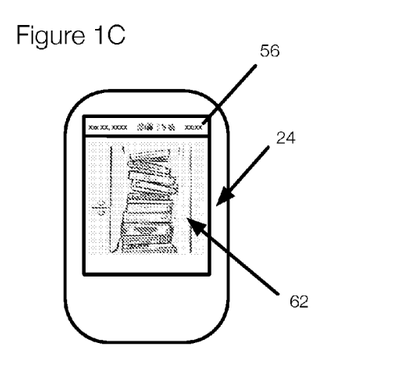

Referring to FIG. 1C, likewise, in the illustrated embodiment, when a hosted software application 34, 36 is activated, the application window generated for it (reflecting execution in the hosted runtime environments 32) is presented identically on the screen 24 as that of a native software application—that is, it is presented without overwriting the status bar 56 (e.g., at least when displaying in default mode).

Another example of the illustrated computing device's 10 merging the user experience so that applications executed in the hosted runtime environment appear, to the user, as if they are executing within the native operating system 14 is the use of a common notification mechanism, e.g., that of the native operating system 14 and/or runtime environments 16, as discussed in the incorporated-by-reference applications identified below.

Still another example is the consistent activation of running software applications in response to user replies to notifications (and otherwise), whether they are native applications, e.g., 15, or hosted software applications 34, 36, Again, as identified by the incorporated-by-reference applications identified below.

Yet still another example is the use of consistent theming as between the hosted software applications and native software applications, as discussed above.

Still other examples will be evident to those skilled in the art from the discussion that follows and otherwise.

Figure 4:
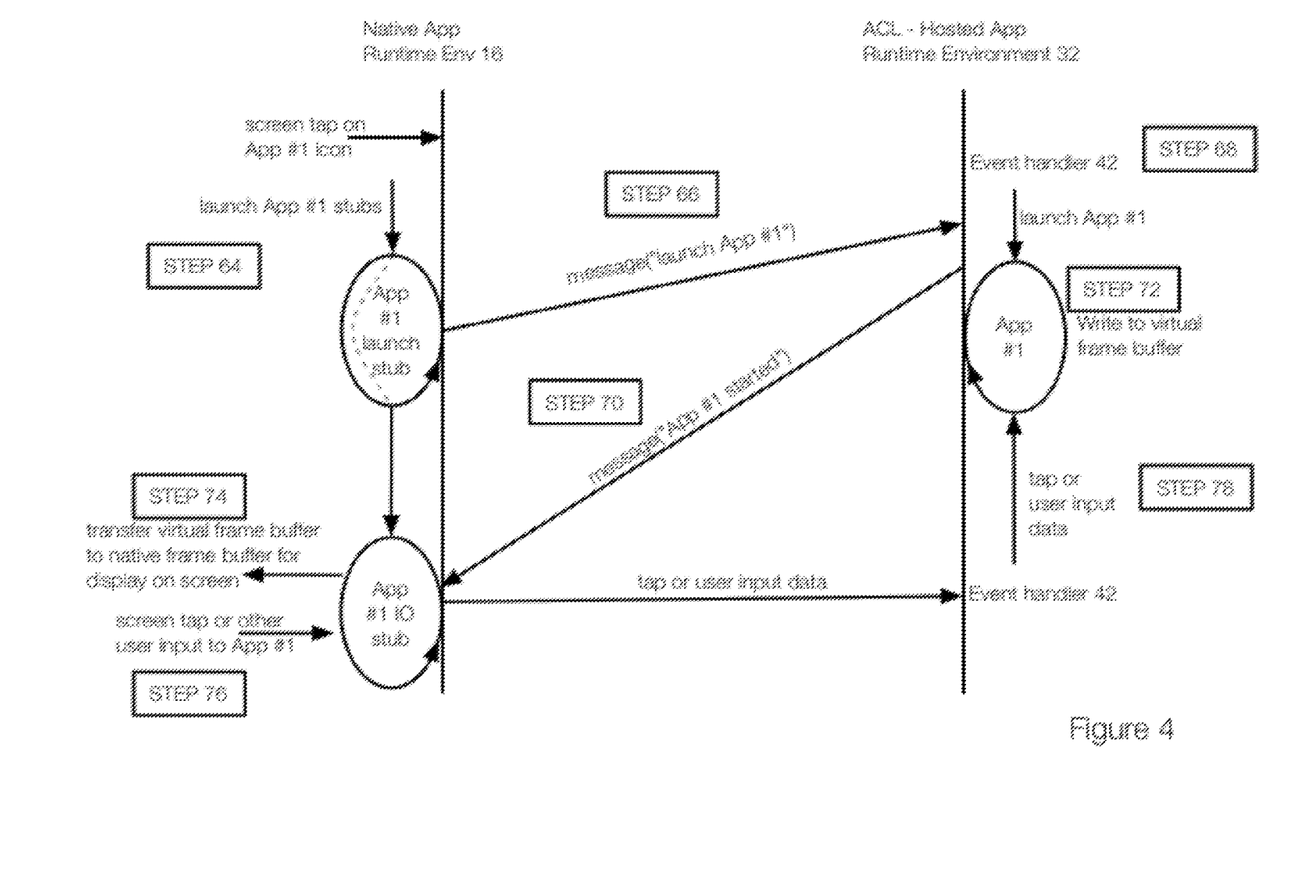
FIG. 4 depicts the interaction of components in launching an exemplary hosted software application based on user interaction with that application's launch proxy executing in a native runtime environment, displaying an application window representing operation of the hosted software application via that application's IO proxy, and transmitting user input from that proxy back to the hosted application.

Hosted Application Display in Multi-Operating System Mobile and Other Computing Devices A further understanding of the operation of device 10 in these regards may be appreciated by reference to FIG. 4, which depicts the interaction of the components discussed above in launching an exemplary hosted software application 34 (here, labelled "App 1") in hosted runtime environments 32 based on user interaction with that app's launch proxy 46 (here, labelled "App #1 Launch Stub") executing in native runtime environments 16, displaying an application window representing operation of hosted software application 34 via that app's IO proxy 50 (here, labelled "App #1 IO Stub"), and transmitting user input from that proxy 50 back to the app 34.

Prior to illustrated step 64, native runtime environments 16 (and/or native operating system 14) present on the above-described graphical desktop (see, e.g., FIG. 1A) icons 58 representing native and hosted software applications that can be selected for launch or other activation by the user of the device 10. As noted above, those icons are provided to native runtime environments 16 and/or native operating system 14 in connection with installation of the respective apps.

As per convention of operating systems of the type of native operating system 14, the native software application that is launch proxy 46 is launched by native runtime environments 16 and/or native operating system 14 upon its selection for activation by the user. See, step 64. Proxy 50 can be simultaneously launched by native runtime environments 16 and/or native operating system 14; alternatively, proxy 50 can be launched by proxy 46 upon its launch. Id.

Upon launch (or other notification of activation from native runtime environments 16 and/or native operating system 14), proxy 46 effects activation of corresponding hosted software application 34. See, step 66.

In the illustrated embodiment, proxy 46 does this by transmitting a launch message to the event handler 42 that forms part of the hosted runtime environments 32 and that is common to the one or more hosted software applications 34, 36 (e.g., in that it is the common, shared recipient of system level-events, such as user input to the hardware interface, which events it distributes to appropriate hosted applications or other software executing in the hosted runtime environments 32 or provided as part of the hosted operating system). The launch message, which can be delivered to event handler 42 by proxy 46 using any convention mechanism for inter process communication (IPC), e.g., APIs, mailboxes, etc., includes an identifier of the proxy 46 and/or its corresponding hosted software application 34, as well as any other information required by the hosted operating system and/or hosted runtime environments 32 to effect launch of a hosted software application.

In step 68, the event handler 42 launches the hosted software application 34 in the conventional manner required of hosted operating system and/or the hosted runtime environments 32. Put more simply, that app 34 is launched as if it had been selected by the user of device 10 directly.

Following launch of hosted software application 34, event handler 42 uses IPC, e.g., as described above, to signal that hosted software application 34 has begun execution and, more aptly, to insure launch (if not already effected) and activation of proxy application 50 with the native runtime environments 16. See, step 70.

Following launch, hosted software application 34 runs in the conventional manner within hosted runtime environments 32—e.g., making such calls to the hosted resource framework 38, hosted event handler 42 and run-time libraries 44, all by way of non-limiting example—as it would otherwise make if it were installed on a device executing a single operating system of the type of the hosted operating system. This is advantageous in that it does not require special recoding (i.e., "porting") of the hosted software application 34 by the developer or publisher thereof in order to make it possible to run in the multi-operating system environment of device 10.

Hosted resource framework 38, hosted event handler 42, run-time libraries 44, and the other components of hosted runtime environments 32 respond to such calls in the conventional manner known in the art of operating systems of the type of hosted operating system, all as adapted in accord with the teachings hereof. Thus, for example, as noted above, some such operations (e.g., those for loading frame buffers) of the type that might normally be executed in a privileged kernel space by hosted runtime environments 32 are, instead, executed in user space. And, by way of further example, other such operations (or, more broadly, functions) are passed-off to native operating system 14 and its runtime environment 16, e.g., via the proxies 46-52.

By way of example, in lieu of loading an actual frame buffer with graphics defining an applications window representing execution of the hosted software application 34, the hosted runtime environment 32 loads the virtual frame buffer 54 with such graphics. See, step 72. The hosted runtime environment 32 effects this through use of windowing subsystem that forms part of the hosted runtime environment 32 and that is common to the one or more hosted software applications 34, 36 (e.g., in that it is the common, shared system used by the hosted software applications for generating applications windows for display to the user of device 10.)

The IO proxy 50 of hosted software application 34 effects presentation on screen 24 of the applications windows generated for application 34 by hosted runtime environments 32, e.g., in the manner shown in FIG. 1C and discussed in connection therewith above. See, step 74. IO proxy 50 does this by transferring the graphics defining that applications window from virtual frame buffer 54 to the native frame buffer 26, e.g., using an API provided by native runtime environments 16 for such purpose or otherwise. Although in some embodiments, the hosted runtime environments 32 utilizes messaging to alert IO proxy 50 of the need for effecting such a transfer, e.g., when the window subsystem of hosted runtime environments 32 has generated an updated applications window for hosted software application 34, when hosted software application 34 becomes the active (or foreground) app in hosted runtime environments 32, or otherwise, in other embodiments IO proxy 50 effects such transfers on its own accord on a periodic basis or otherwise.

User/Hosted Application Interaction in Multi-Operating System Mobile and Other Computing Devices IO proxy 50 utilizes a mechanism paralleling that discussed above in connection with steps 64-68 in order to transmit taps and other input made by the user to device 10 and specifically, for example, to display/touch screen 24, a keyboard, trackball, touch stick, other user input devices. In this regard, a common event handler (not shown) or other functionality of native runtime environments 16 notifies applications executing within them, including the IO proxies 50, 52, of user input made with respect to them via the touch screen 24 or those other input devices. Such notifications are made in the conventional manner known in the art of operating systems of the type of native operating system 14, as adapted in accord with the teachings hereof.

When IO proxy 50 receives such a notification, it transmits information with respect thereto to its corresponding hosted software application 34 via event handler 42, e.g., in a manner similar to that discussed above in connection with step 66. See, step 76. That information, which can be delivered to event handler 42 by IO proxy 50 using any conventional IPC mechanism, can include an identifier of the IO proxy 50 and/or its corresponding hosted software application 34, an identifier of the device to which input was made, the type of input, and relevant information with respect thereto (e.g., location, time, duration and type of touch, key tapped, pressure on pointer, etc.). That information is received by event handler 42 and applied to the corresponding hosted software application 34 in the conventional manner required of hosted operating system and/or the hosted runtime environments 32, e.g., as if the touch or other user input had been made directly to hosted software application 34. See, step 78.

In-Process Trapping

Figure 5:
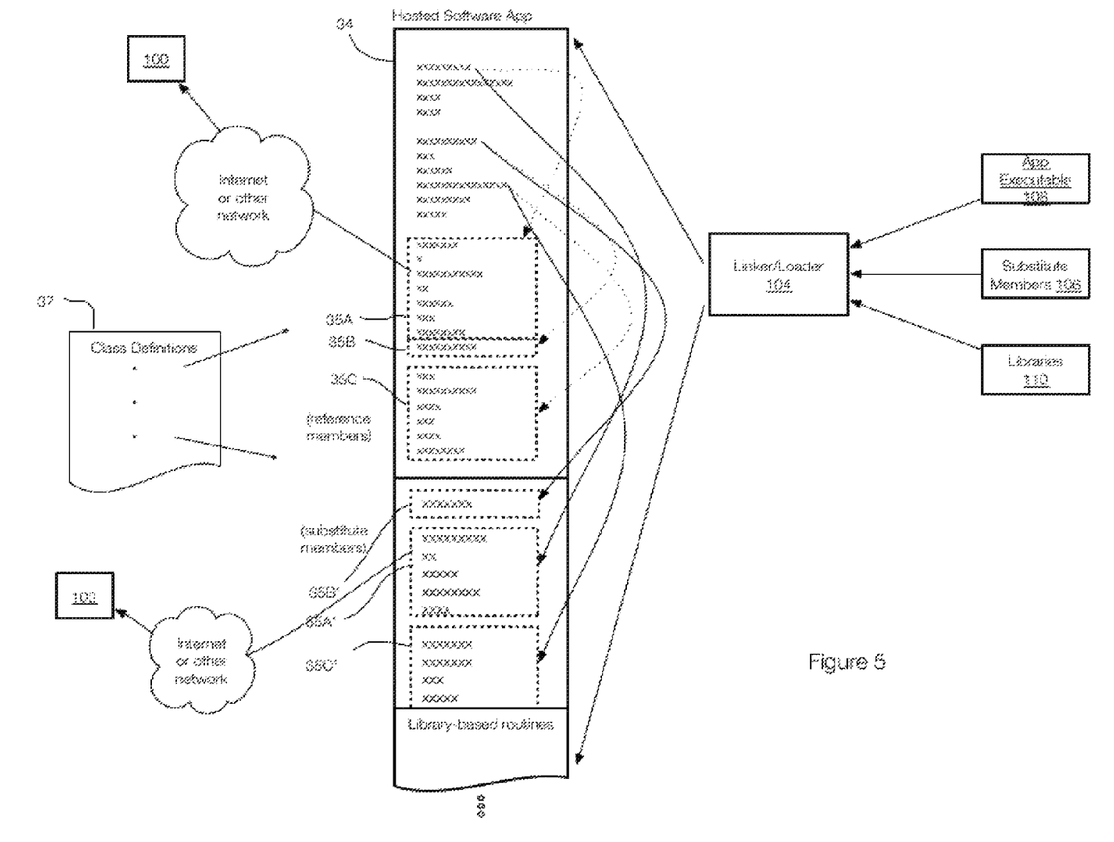
FIG. 5 depicts a hosted application in a system according to the invention in which instructions referencing selected members of objects are replaced with references to substitute members.

As noted, the hosted software application 34 makes such calls to the hosted resource framework 38, hosted event handler 42 and run-time libraries 44, etc., as it (application 34) would otherwise make if it were installed on a device executing a single operating system of the type of the hosted operating system. Moreover, as indicated in FIG. 5, application 34 includes instructions 34A-34C referencing data members and/or method members 35A-35C, respectively, of OOP objects of the type it (application 34) would otherwise reference if it were installed on such a device. Those referenced members 35A-35C can be for access to data, functions or services external (i.e., not local) to application 34 or otherwise. Here, they are shown as local data and functions, for convenience.

That the application 34 can make such calls and reference such objects and/or members as it would otherwise do if it were installed on a device executing a single operating system of the type of the hosted operating system, is advantageous in that it does not require special recoding (i.e., "porting") of the hosted software application 34 by the developer or publisher thereof in order to make it possible to run in the multi-operating system environment of device 10.

The hosted resource framework 38, hosted event handler 42 and run-time libraries 44 respond to calls by application 34 in the conventional manner known of operating systems of the type of hosted operating system as adapted in accord with the teachings hereof.

Thus, for example, as discussed above, the framework 38, handler 42 and libraries 44 are adapted so that some operations that might normally be executed via some mechanisms by such operating systems are passed-off to native operating system 14 and its runtime environment 16, e.g., via the proxies 46-52 or otherwise, for execution by other mechanisms (e.g., ones consistent with those utilized in servicing native software applications). And, as also discussed above, some operations (e.g., those for loading frame buffers) of the type that might normally be executed in a privileged kernel space are, instead, executed in user space—again, by way of non-limiting example.

Processing such calls by the hosted software application 34 by such alternate mechanisms is facilitated by the fact that (a) the application 34 is executed as a separate process than those of the hosted resource framework 38, hosted event handler 42, run-time libraries 44 and/or other out-of-process code that it (application 34) calls, and (b) those calls can therefore be intercepted or "trapped" in the convention manner known in the art (as adapted in accord with the teachings hereof).

However, since the execution of instructions 34A-34C by application 34 referencing data and/or method members 35A-35C of objects occurs in-process, the illustrated device 10 cannot typically rely on the hosted resource framework 38, hosted event handler 42, run-time libraries 44 or other out-of-process code to trap those instructions. In order to do so, device 10 of the illustrated responds to selected such instructions by accessing data and/or executing code other than that specified by those instructions.

More particularly, in the illustrated embodiment, device 10 responds to instructions 34A-34C in the application 34 that reference at least selected members ("referenced members") of objects defined by an object-oriented programming class ("referenced class") 37 by executing those instructions utilizing data and/or code—hereinafter, "substitute members 35A'-35C', respectively—other than that specified by the class and member referenced by those instructions. In the illustrated embodiment, the device 10 achieves this by loading the substitute members 35A'-35C' (in lieu of the referenced members 35A-35C) with the application 34; this is done at load time while the hosted runtime environment(s) 32 are initialized, e.g., when native application 18 (e.g., ACL) and/or device 10 are booted. In other embodiments, it can be done at application 34 installation- and/or execution-time.

Although only one referenced class 37 is shown in the drawing and discussed here for sake of convenience, it will be appreciated that the teachings hereof apply, as well, to instances in which there are multiple reference classes.

By substituting and accessing/executing substitute members 35A'-35C' for instructions of application 34 referencing selected referenced members 35A-35C, e.g., as described above, device 10 can, effectively speaking, intercept or trap uses of those referenced members 35A-35C by application 34. This allows the device 10, for example, to cause the application 34 to utilize different mechanisms to provide access to data, functions, and/or services than would be utilized through the referenced members 35A-35C, themselves.

The referenced class(es) 37 may be, by way of non-limiting example, one or more classes published by an enterprise or other entity/organization that promotes versions of the hosted operating system. And, the selected referenced members 35A-35C may be, by way of non-limiting example, those members of that class that access data, functions and/or services that are not local to the process in which application 34 is executed and/or proprietary data, functions and/or services of that or another enterprise, entity or organization. Examples include data, functions and/or services pertaining to mapping, navigation, advertisement, digital wallet, account authorization, telephony, camera, address/contacts, document preview, and music/multimedia playback services, all by way of non-limiting example.

The substitute members 35A'-35C' can comprise any data and/or code suitable for loading with the application 34, e.g., when hosted runtime environment(s) 32 are initialized (e.g., upon boot-up of native application 18 and/or device 10), at application 34 installation time, upon invocation of that application by a user of device 10, and/or otherwise. While code-based substitute members can comprise as little as a NOOP (no operation) operation, for example, more typically, they provide like functionality (from the perspective of the application 34) as the referenced member for which they are substituted, yet, that utilize different mechanisms therefor.

By way of example, in instances where a referenced member, e.g., 35A, is a method member of an object (instantiated from class 37) of the hosted application 34 which (object) invokes a proprietary web-based mapping service 100 of a third-party (e.g., enterprise or other entity/organization that promotes versions of the hosted operating system, or otherwise), the corresponding substitute member, e.g., 35A', can invoke a alternate mapping service 102, e.g., of another party—or, alternatively or in addition, can invoke a function and/or service (not shown) local to the device 10 and, more particularly, for example local to the hosted runtime environments 32, framework 38, hosted handler 42, hosted libraries 44, native runtime environments 16, native runtime libraries 20, or otherwise.

By way of further example, in instances where the referenced member, e.g., 35B, is a data or method member of an object (instantiated from class 37) of the hosted application 34 which (object) is partially or wholly inoperative, the corresponding substitute member, e.g., 35B', can provide requisite data and/or functions/services to that application 34 utilizing an alternate and operative mechanism local or non-local to device 10 and, particularly, for example, to the hosted runtime environments 32, framework 38, hosted handler 42, hosted libraries 44, native runtime environments 16, native runtime libraries 20, or otherwise.

The aforementioned different mechanisms can be, according to some aspects of the invention, different web (or other external) services. Thus, for example, the referenced member can be a method member defined by the referenced class, object instantiations of which class utilize a first external web service to support mapping, navigation, advertisement, digital wallet, account authorization and/or other services required by the first hosted software application, whereas the substitute member is a method member of an object instantiated from the replacement class that utilizes a second, different web service to support such service(s).

Substitute members 35A'-35C' that are executed by device 10 in substitute for referenced members that are data members of their respective classes preferably permit the storage and/or retrieval of values in the same format as those of the corresponding referenced members.

Likewise substitute members 35A'-35C' that provide or invoke functions or services accept input arguments and return output arguments in a form expected by application 34. Since the differing mechanisms employed by them (vis-à-vis the referenced members in substitution for which they are execute) do not necessarily, themselves, accept and/or return arguments in those same formats, in some embodiments the substitute members include code for any necessary conversions, reformatting, etc.

As noted, in the illustrated embodiment, references to the substitute members are substituted for the corresponding referenced members in the hosted software application 34, e.g., when hosted runtime environment(s) 32 are initialized (e.g., upon boot-up of native application 18 and/or device 10), at application 34 installation- and/or execution time. This is indicated in FIG. 5, wherein the reference made by instruction 34A to referenced member 35A are replaced with references to substitute member 35A'; the reference made by instruction 34B to referenced member 35B are replaced with references to substitute member 35B'; and the reference made by instruction 34C to referenced member 35C are replaced with references to substitute member 35C'.

In instances where such substitution is effected during initializing of the hosted runtime environments 32, the native application 18 which supports those environments (e.g., ACL) utilizes a class loader 104 of the type normally used in operating systems of the type of the hosted system, albeit modified to reference substitute classes. In instances where such substitution is effected at installation time, installer app of the hosted operating system can invoke a loader 104 of the type commonly used in connection with hosted app installation (albeit, as adapted in accord with the teachings hereof) so that symbolic references in the hosted software app executable resolve to substitute members rather than referenced members. Likewise, in instances where this is effected at execution time, the event handler 42 can effect such invocation of such a loader 104 of the type commonly used in connection with hosted app invocation (again, as adapted in accord with the teachings hereof). In all instances, code for substitute members 106 can be provided, for example, to the class loader 104 for loading, along with hosted software application executable 108, library routines 110, etc., all in the conventional manner known in the art.

A more complete understanding of the operation of systems according to the invention may be attained by reference to U.S. patent application Ser. No. 14/061,288, filed Oct. 23, 2013 (now, U.S. Patent Publication No. US 2014-0115606), and U.S. patent application Ser. No. 61/892,896, filed Oct. 18, 2013, both entitled MULTI-PLATFORM MOBILE AND OTHER COMPUTING DEVICES AND METHODS," the teachings of which are incorporated by reference herein.

Conclusion

Described above and shown in the drawings are devices and methods meeting the desired objects, among others. Those skilled the art will appreciate that the embodiments described and shown here in our merely examples of the invention and that other embodiments, incorporating changes to those here, fall within the scope of the invention, as well.

In view thereof, what we claim is:

1. A digital data processing method comprising the steps of:
executing, on a computing device, a native operating system including one or more native runtime environments within which one or more native software applications are executing, where each such native software application has instructions for execution under the native operating system,
executing, within the one or more of the native runtime environments, one or more hosted runtime environments, where each of which hosted runtime environments executes hosted software applications that have instructions for execution under a hosted operating system that differs from the native operating system,
executing, within a first process of the hosted runtime environments, a first hosted software application that includes an instruction that references a member (hereinafter, "referenced member") of an object defined by an object-oriented programming (OOP) class ("referenced class"), wherein the referenced member is any of a method member and a data member,
executing, with the process, that instruction utilizing data and/or code (hereinafter, "substitute member") other than that specified by the referenced class as the referenced member,
wherein a substitute member replacing a corresponding referenced member is loaded by a class loader,
wherein the referenced member and the substitute member provide like functionality, yet, utilize different mechanisms therefor,
wherein those different mechanisms are different services external to the device,
wherein those different mechanisms are different web services, and
wherein the references member is a method member defined by the referenced class and the method member utilizes a first external web service to support any of mapping, navigation, advertisement, digital wallet, account authorization and/or other services required by the first hosted software application.

2. The method of claim 1, in which the referenced member and the substitute member provide like functionality, yet, utilize different mechanisms therefor.

3. The method of claim 2, wherein those different mechanisms are different services external to the device.

4. The method of claim 3, wherein those different mechanisms are different web services.

5. The method of claim 2, comprising substituting a reference to the substitute member into the first hosted software using any of the class loader.

6. A computing device comprising:
a central processing unit,
the central processing unit executing a native operating system including one or more native runtime environments within which one or more native software applications are executing, where each such native software application has instructions for execution under the native operating system,
one or more hosted runtime environments executing within the one or more of native runtime environments, where each of which hosted runtime environments executes hosted software applications that have instructions for execution under a hosted operating system that differs from the native operating system,
a first hosted software application executing within a first process of the hosted runtime environments includes an instruction that references a member (hereinafter, "referenced member") of an object defined by an object-oriented programming (OOP) class ("referenced class"), wherein the referenced member is any of a method member and a data member,
the process executes that instruction utilizing data and/or code (hereinafter, "substitute member") other than that specified by the referenced class as the referenced member,
wherein a substitute member replacing a corresponding referenced member is loaded by a class loader,
wherein the referenced member and the substitute member provide like functionality, yet, utilize different mechanisms therefor,
wherein those different mechanisms are different services external to the device,
wherein those different mechanisms are different web services, and
wherein the references member is a method member defined by the referenced class and the method member utilizes a first external web service to support any of mapping, navigation, advertisement, digital wallet, account authorization and/or other services required by the first hosted software application.

7. The computing device of claim 1, wherein the substitute member comprises code that utilizes a second, different web service to support the aforesaid service(s).

8. The computing device of claim 1, wherein those different mechanisms are different services native to the computing device and/or the runtime environments thereon.

9. The computing device of claim 8, wherein the referenced member is a method member defined by the referenced class, which method member utilizes a telephony, camera, address/contacts, document preview, music/multimedia playback or other service native to the hosted runtime environments, and the substitute member comprises code that utilizes a service of the native runtime environments and/or native operating system to support those aforesaid service(s).

10. The computing device of claim 9, in which the references in the first software application to the referenced member and/or the referenced class are resolved to the substitute member during loading of that software application on the device.

\* \* \* \* \*